(12) United States Patent
Zimmer et al.

(10) Patent No.: US 8,287,218 B2
(45) Date of Patent: Oct. 16, 2012

(54) CEMENT ANCHOR FOR LIGHTWEIGHT CONSTRUCTION PANELS

(76) Inventors: Günther Zimmer, Rheinau (DE); Martin Zimmer, Rheinau (DE)

( * ) Notice: Subject to any disclaimer, the term of this patent is extended or adjusted under 35 U.S.C. 154(b) by 198 days.

(21) Appl. No.: 12/799,509

(22) Filed: Apr. 26, 2010

(65) Prior Publication Data

US 2010/0287874 A1    Nov. 18, 2010

Related U.S. Application Data

(63) Continuation of application No. PCT/DE2008/001729, filed on Oct. 24, 2008.

(30) Foreign Application Priority Data

Oct. 26, 2007    (DE) .................... 10 2007 051 628

(51) Int. Cl.
*F16B 19/02*    (2006.01)
(52) U.S. Cl. .................................. 411/82; 411/82.5
(58) Field of Classification Search ............ 411/82, 411/82.5; 405/259.5
See application file for complete search history.

(56) References Cited

U.S. PATENT DOCUMENTS

| | | | | |
|---|---|---|---|---|
| 3,612,803 A * | 10/1971 | Klaas | ....................... | 219/633 |
| 3,897,713 A * | 8/1975 | Gugle | ........................ | 411/389 |
| 3,936,924 A * | 2/1976 | Ichise et al. | .................. | 29/426.1 |
| 4,055,051 A * | 10/1977 | Finney | ....................... | 405/259.6 |
| 4,100,954 A | 7/1978 | Muller et al. | | |
| 5,075,034 A * | 12/1991 | Wanthal | ...................... | 252/511 |
| 5,666,779 A * | 9/1997 | Fuchs et al. | ..................... | 52/705 |
| 5,770,296 A * | 6/1998 | Remerowski et al. | ........ | 428/80 |
| 6,017,176 A * | 1/2000 | Marui | .......................... | 411/82 |
| 6,484,471 B2 * | 11/2002 | Steed et al. | ..................... | 52/704 |
| 6,543,976 B1 * | 4/2003 | Malofsky et al. | ............... | 411/82 |
| 6,896,462 B2 * | 5/2005 | Stevenson et al. | .............. | 411/82 |
| 6,971,829 B2 * | 12/2005 | Shomler et al. | ................. | 411/82 |
| 2006/0113031 A1 * | 6/2006 | Langtry et al. | ................ | 156/293 |

FOREIGN PATENT DOCUMENTS

| | | |
|---|---|---|
| DE | 10 2005 01252 | 10/2006 |
| DE | 10 2006 049 953 | 4/2008 |
| GB | 2 095 355 | 9/1982 |

* cited by examiner

*Primary Examiner* — Gary Estremsky
(74) *Attorney, Agent, or Firm* — Klaus J. Bach (57) ABSTRACT

In a cement anchor for use in connection with lightweight construction panels, wherein the anchor comprises a cylindrical body with at least one piston forming with the cylindrical body a displacement area in which a meltable cement is disposed together with a heatable melt body, the melt body is heated just before the anchor is inserted into a bore in the panel so that the cement is liquefied and, upon compression of the anchor, is displaced from the displacement area into the space around the anchor, so that, upon solidification of the cement, the anchor is firmly connected to the lightweight construction panel.

8 Claims, 7 Drawing Sheets

CEMENT ANCHOR FOR LIGHTWEIGHT CONSTRUCTION PANELS

This is a Continuous-In-Part Application of pending international patent application PCT/DE2008/001729 filed Oct. 24, 2008 and claiming the priority of German patent application 10 2007 051 628.4 filed Oct. 26, 2007.

BACKGROUND OF THE INVENTION

The present invention resides in a cement anchor and in a method of installation the anchor in lightweight construction panels. The anchor includes at least a cylindrical body and a piston member accommodated in the cylindrical body so as to define a displacement chamber and the cylindrical body and/or the piston member includes at least one discharge opening.

The lightweight construction panels are often also called sandwich- or honeycomb panels. They are often used in furniture construction and comprise rigid cover layers of wood chip plates, medium- or high-density fiber plates, plywood or hard fiber plates. The sandwich panels include as center layer or support core for example polyurethane foam or polystyrol. In honeycomb panels, often corrugated web inserts or so-called expanded honeycomb sheets are used as intermediate layers. Most lightweight construction panels have a raw density which is below 500 kg/m³. If no fire resistant aluminum foams or expanded glass are used for the intermediate layers, the raw density is even below 350 kg/m³. For comparison, the raw density of a woodchip plate without cover sheets is about 600 to 750 kg/m³.

If hardware is to be mounted to lightweight construction panels for example by means of screws, it is problematic that the fastening means find support only in the relative thin upper cover plate.

In this regard, the non pre-published patent publication DE 10 2006 049 935 A1 discloses an anchor consisting of at least two parts which are moved into one another during the installation of the anchor. A partially pot-like component takes on the function of a cylinder whereas a pin-like component takes on the function of a piston. In the bottom of the pot-like component, there is a cement shell whose balloon-like sleeve breaks open when the two anchor parts are moved into one another. The cement then flows into the lower part of the lightweight construction panel.

DE 10 2005 012 521 A1 discloses an arrangement wherein a hardware component is to be cemented onto a wood material element. To this end, a planar connecting area of the metal hardware is coated by a cement material. A method is described for heating the metal hardware by induction heating directly before its installation for joining it with the wooden material element.

It is the object of the present invention to provide a cement anchor for lightweight construction panels, which is easy to install and, when installed, is securely and durably retained in the lightweight construction panel.

SUMMARY OF THE INVENTION

In a cement anchor for use in connection with lightweight construction panels, wherein the anchor comprises a cylindrical body with at least one piston forming with the cylindrical body a displacement area in which a meltable cement is disposed together with a heatable melt body, the melt body is heated just before the anchor is inserted into a bore in the panel so that the cement is liquefied and, upon compression of the anchor, is displaced from the displacement area into the space around the anchor, so that, upon solidification of the cement, the anchor is firmly connected to the lightweight construction panel.

Further, in an anchor installation method wherein the cement anchor, in which at least one electrically conductive and/or ferromagnetic meltable body surrounds the flowable cement at least over certain areas thereof or is at least partially surrounded thereby, is moved through a high-frequency magnetic alternating field immediately before the installation. Upon insertion of the cement anchor into a bore in the lightweight construction plate which accommodates the cement anchor, the cylindrical body and the piston body are compressed so as to displace the flowable cement. As a result, the cement, which is being displaced from the cement anchor, upon hardening, cements the cylinder body and the piston body to the lightweight construction panel and also the cylinder body to the piston body.

With the present invention, a so-called hydraulic cement anchor with at least one integrated externally heatable meltable cement body is provided which has essentially the form of a cylinder-piston unit. As provided for installation, the cylinder is generally filled with a solid cement body and at least one heat generating body. The piston and cylinder enclose the cement material body.

Immediately before the installation, the cement anchor is subjected to a high-frequency magnetic alternating field which induces in the melt body large eddy currents, which melt the nearby solid cement rapidly for a short time.

When now the cylinder-piston unit is inserted, with cement material melted, into a bore of a lightweight construction panel and, there, the piston is pushed into the cylinder or, vice versa, the cylinder is pushed over the piston, the cement, subjected to pressure, flows out of the cylinder. The still liquid cement can then be conducted via bores or channels to those areas where it is needed for retaining the anchor in the lightweight construction panel. After the telescopic sliding of the piston into the cylinder the cement solidifies and firmly retains the anchor in the lightweight construction panel. Into the installed unit of tough elastic plastic, a screw can be threaded even during the curing of the cement.

In order to compensate for uneven thickness of the lightweight construction panel, these cement anchors do not need any interlocking structure. If the cement reservoir of the individual cement anchor type is large enough, that particular type may also be used for lightweight construction panels of different wall thicknesses. In connection with thicker panels, the piston is just inserted into the cylinder to a lesser degree.

The invention will become more readily apparent from the following description of particular embodiments thereof on the basis of the accompanying drawings.

DESCRIPTION OF PARTICULAR EMBODIMENTS

Figure 1:
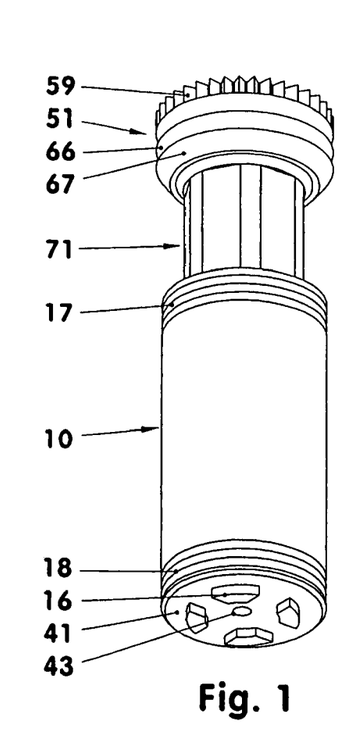
FIG. 1 is a perspective view of an anchor with a metal spring insert.

FIG. 1 shows a cement anchor in a state as provided by a supplier. In the cylinder body 10 of the cement anchor, a piston body 50 is disposed which is partially inserted into the cavity 31 of the cylinder body 10, see FIGS. 9 and 11. Between the piston body 50 and the cylinder body 10, a solid cement body 8 is enclosed, see FIG. 5.

Figure 2:
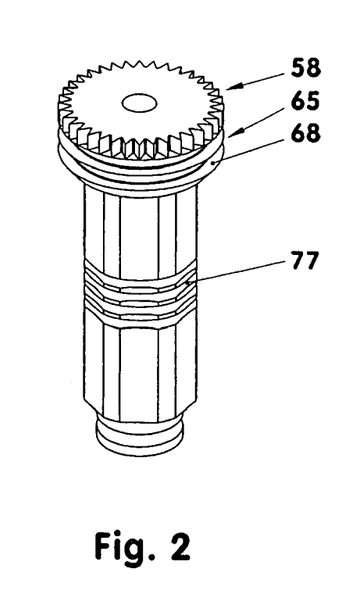
FIG. 2 shows a piston body of the anchor shown in FIG. 1.
Figures 13, 14:
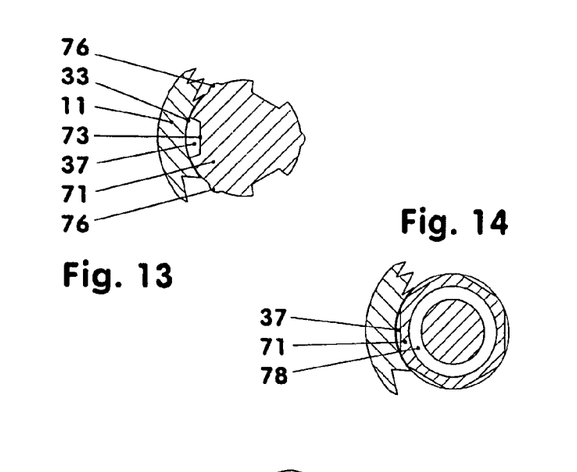
FIG. 13 is a cross-sectional view of the piston body of FIG. 5 taken at a level of the engagement knubs.
FIG. 14 is a cross-sectional view of the piston body as shown in FIG. 5 taken below the circumferential grooves.

FIG. 2 shows a piston body 50 whose piston section 51 has a hexagonal cross-section, see FIG. 14.

Figure 3:
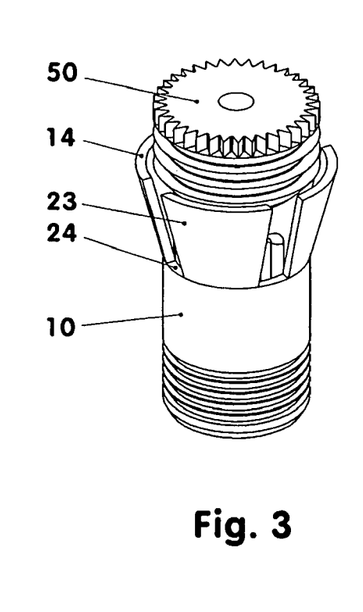
FIG. 3 is a perspective view of an anchor with a metallic cylinder body.
Figure 4:
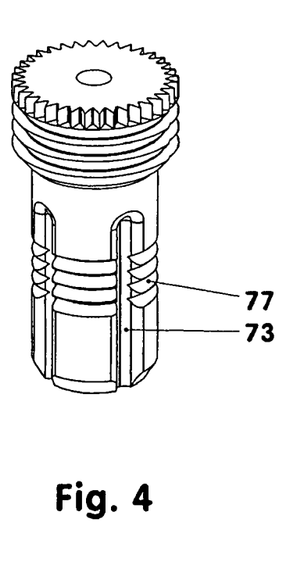
FIG. 4 shows a piston body as used in the anchor of FIG. 3.

FIG. 3 shows a cement anchor fully compressed without cement. With this anchor variant, the cylindrical body 10 has radially extending engagement elements 23. Next to it, in FIG. 4, the respective piston element 50 is shown. It has a cylindrical cross-section into which for example four channels 73 are formed.

Figure 5:
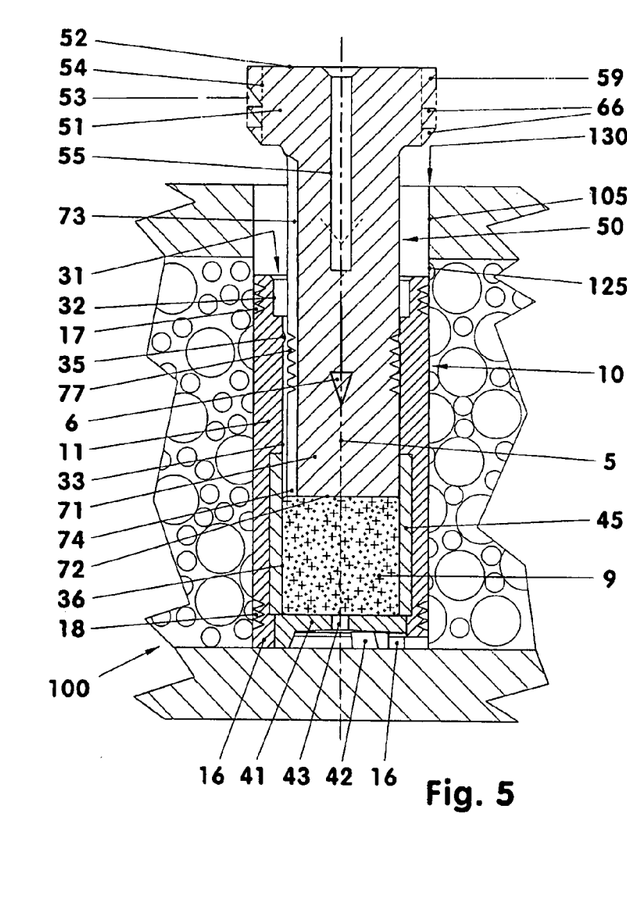
FIG. 5 is a cross-sectional view of an anchor with a cylinder body with a metal sleeve.

FIG. 5 shows the cement anchor in an axial cross-sectional view. Its cylindrical body is shown disposed without locking means and rigid inserts, see FIG. 7, in a lightweight construction panel 100 on which by means of the cement anchor for example some furniture hardware 90 is to be mounted.

The lightweight construction panel 100 comprises two cover plates 101, 111 and an intermediate support core 121. Each cover plate 101, 111 consists in the exemplary embodiment of a thin chip plate. The support core 121 is in this case for example a PU foam core. At their inner surfaces 103, 113, the cover plates 101, 111 are glued to the plate-like support core 121. The lightweight construction panel has a wall thickness of 20 to 40 mm. Each cover plate is for example 2 to 8 mm thick. Instead of the foam core, the construction panel may also have a honeycomb core. The lightweight construction panel 100 also includes a bore 130 which comprises sections 105 and 125.

The lightweight construction panel 100 may also be curved, that is, it may, for example, be cylindrical or spherical as long as the material thickness of the support core 121 is at least approximately constant.

To permit the installation of a cement anchor 10, a bore is drilled into or through the first cover plate 101 and the support core 121. As drilling tool for example a spiral drill is used, which has a tip angle of 180°. Possibly also a spot facer may be used. Depending on the type of anchor, the bore 130 may also be drilled by a stepped spot facer.

The opening, or respectively, the bore 130 is blown out for example by compressed air or it is sucked out.

The cylindrical body 10 is a pot-shaped component which comprises a tubular section 11 with a bottom 41. In the shown embodiment, the bottom 41 is clamped, cemented or welded to the tubular section. The bottom 41 however can also be formed integrally with the tubular section if it consists of plastic material.

The tubular section 11 is provided in the shown embodiment with for example three legs 16 by which it is supported on the inner surface 113 of the lower cover plate 111. The outer wall of the tubular section 11 is for example mostly cylindrical. At its upper and lower ends, the outer wall may be structured. In accordance with FIGS. 5 to 7, there are provided, in each case, three circumferential grooves 17, 18. The individual grooves 17, 18 of each group are uniformly spaced from one another. They have a depth of for example 0.3 to 0.8 mm.

The inner wall of the tubular section 11 which, in this case consists of plastic is divided into an upper distribution area 32, a central cylindrical area 33 and a lower displacement area 36. The cylindrical area 33 and the displacement area 36 have the same diameter which is smaller, by about one millimeter, than the inner diameter of the distribution area 32. In the upper part of the cylindrical area 33 for example six inwardly extending support projections 35 are provided at the inner circumference and evenly spaced around the circumference.

In the displacement area 36 a melt body 45 in the form of a metallic cylindrical sleeve is disposed. The cylindrical sleeve 45 is for example inserted into the tubular section 11 later by way of an elastic expansion of the lower part of the cylinder 22. It is also possible to injection-mold the cylinder body 10 around the cylinder sleeve 45. In the shown example, the cylindrical sleeve 45 is longer than the space in which the cement is disposed. This permits additionally heating of the lower channel ends 74.

Figure 8:
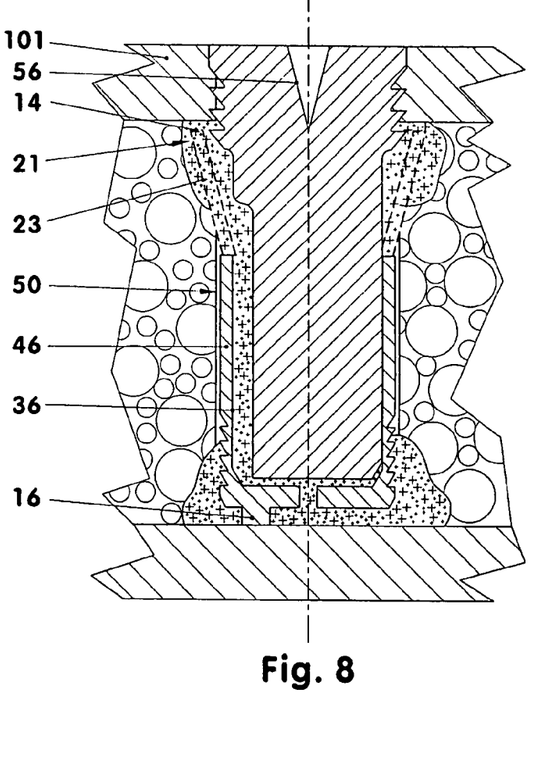
FIG. 8 is a sectional view of the anchor of FIG. 3 installed in a lightweight construction panel.

Alternatively, the cavity 31 of cylinder body 10 may be provided with an inner cylindrical wall which extends over the full length thereof, see FIG. 8. Then the cylindrical sleeve 45 is inserted into the cavity from the top. The cylindrical sleeve may also be provided with a bottom formed thereon.

Figure 6:
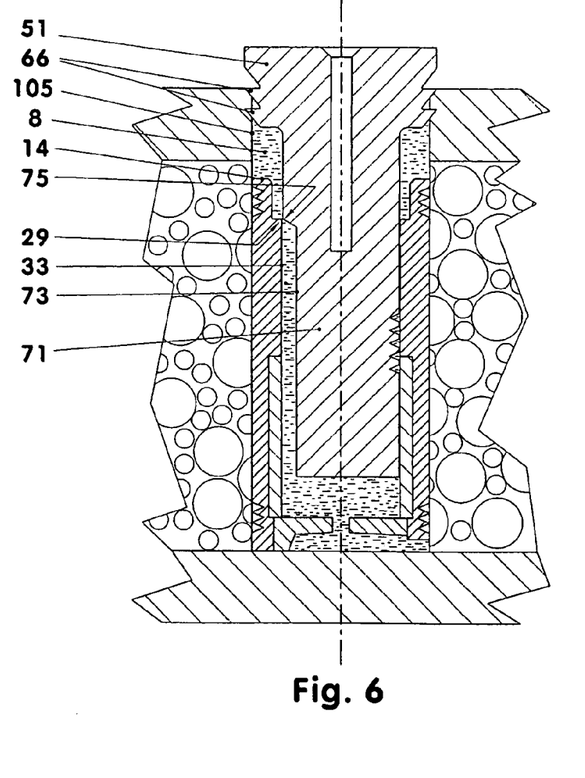
FIG. 6 is a view-like FIG. 5, but with shortened channels and the cement pumped out.

In accordance with FIGS. 5 to 6, the cylindrical sleeve may be a tube consisting of an aluminum alloy. The aluminum alloy is at least electrically conductive. Only in this way, it is ensured that the eddy currents can be induced in the cylindrical sleeve 45 by an outer high-frequency magnetic alternating field which is needed for the heating of the sleeve.

The cylindrical sleeve 45 may also consist of a ferro-magnetic material such as iron, nickel, or cobalt. Another ferro-magnetic alternative is a Hensler alloy, for example, $Cu_2MnAl$. The ferromagnetic materials amplify the effects of a magnetic field.

All the materials or alloys mentioned herein may also be used for the melting bodies 46-49 mentioned below.

The toward the displacement area 36 planar bottom 41 has for example three legs 42 which are disposed on the inner surface 113 of the lower cover plate 111. They are arranged radially in front of the legs 16 of the tubular section 11. The bottom 41 which, instead of plastic material, may consist of an electrically conductive and/or ferromagnetic material has in this case for example a central discharge opening 43.

The cement material 9 is disposed at the bottom of the cylindrical body 10 as a solid cylinder surrounded by the melt body 45. The cement material 9 is needed in the form of a meltable single component cement, for example, a reactive melt cement on the basis of polyurethane which requires moisture for the chemical cross-linking. At about 100° to 120°, it has a density of 3000 to 6000 mPs. The cement 8 can be heated up to 170° without any increase in volume.

In FIG. 5, the cement 9 is surrounded by the melt body 45 at least over some area thereof. The upper and the lower front surface of the cement however are not covered by an electrically conductive and/or ferromagnetic material. But the lower front face may also be covered if the bottom is in the form of a melt body.

The piston body 50 consists of a piston section 71 and an engagement section 51. The piston section 71 is largely cylindrical. It has an outer diameter which corresponds to the inner diameter of the cylindrical area 33 of the cylinder body 10. In the area of the lower front end thereof, that is the piston bottom surface 72, it tightly abuts the cylindrical area 33. At the outer wall of the piston section 71, there are for example three channels 73 arranged equidistantly for conducting the softened cement, see cross-section 37 in FIG. 14. Each channel 73 is for example about 0.5 mm deep and on the average 1.85 mm wide. The channels 73, which extend for example parallel to the center line 5, end at the bottom at the piston bottom surface 72 and reach at the top, at least as shown in FIG. 5, for example up to the engagement section 51.

The channels 73 may also be formed into the wall of the cylindrical area 33. Furthermore, the channels may be bores in the components 10 or 50.

In the intermediate area the outer wall of the piston section 71 is provided with a structure which is intended to improve the adherence of the cement to the piston section 71. There may be for example four transverse grooves 77, see FIGS. 2, 4.

The engagement section 51 has for example an outer cylindrical area 53 which is divided into two zones 58, 65 which are differently structured. As outer cylindrical area 53, for example, a circumferential surface area is designated on which specifically those points of the structures 58, 65 are disposed which have the same maximum distance from the center line 5. The diameter of this circumferential surface area 53 is greater than the inner diameter of the bore 130 of the lightweight construction panel 100 into which the cement anchor is inserted.

The first zone of the engagement section 51 includes a longitudinal scoring as the structure 58. This longitudinal scoring 58 is a kind of serration including straight teeth 59 with pointed tips. In the shown embodiment, the tooth width is about 1 mm. The bottom width of the teeth is about 0.7 mm. In FIGS. 1-4, the scoring or serration 58 includes 36 teeth. The profile angles of the left and right tooth flanks are the same. Depending on the particular embodiment, the number of teeth is between 15 and 20. The serration has a constant pitch.

Alternatively, the structure 58 may compromise an aggregation of for example semispherical projections.

The second zone of the engagement section 51 includes a structure, a transverse serration 65. The transverse serration 65 comprises for example two to four circumferential webs 66. All webs 66 have for example the same cross-section and the same cross-sectional shape. The webs 66 are also spaced equidistantly.

Each web 66 has a slide flank 67 and a locking flank 68. The slide flank 67 has the form of a truncated cone envelope whose virtual tip is disposed on the center line 5—as shown in FIG. 5—below the engagement section 51. The cone angle of the truncated cone envelop is in the present case 80°.

At the backside of the slide flank 67, there is for example a planar locking flank 68. A normal on the plane of the locking flank 68 extends parallel to the center line 5. The intersection between the side flank 67 and the locking flank 68 is disposed on the enveloping surface 53.

The last web 66, that is, the web which is disposed directly adjacent the longitudinal scoring 58 converges directly to the longitudinal serrations. The locking flank 68 of this web 66 exists only in the gaps between the teeth of longitudinal serrations 58.

Figure 7:
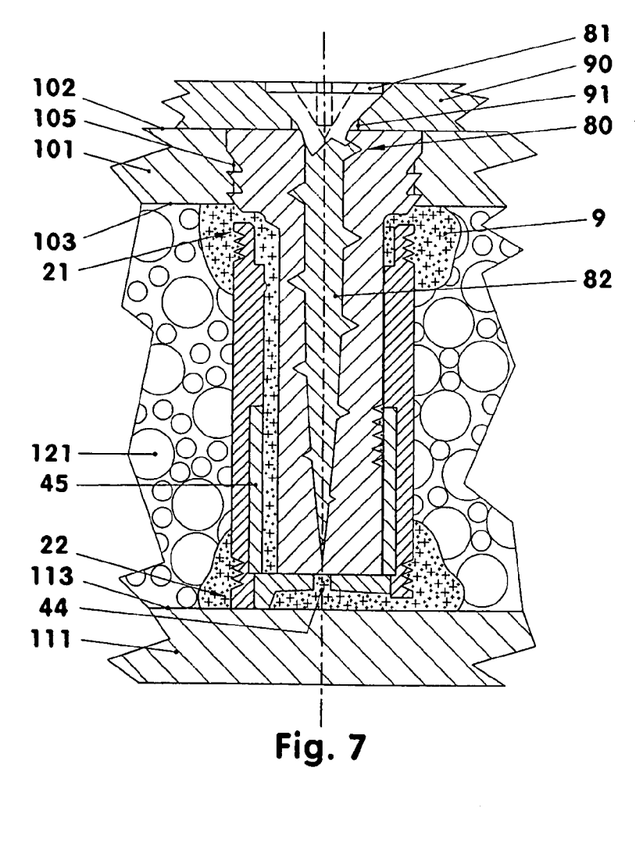
FIG. 7 shows the anchor of FIG. 5 fully installed and with furniture hardware mounted thereon.

In the shown embodiment, the diameter of the enveloping surface 53 is greater, by 0.5 mm, than the inner diameter of the bore 105—see FIG. 5. When the piston section 71 is inserted into the bore 130 and the engagement section 51 is pressed into the bore 105, the webs 66 are engaged in the lower layers of the cover plate 101 whereas the teeth of the longitudinal serrations 58 pierce into the surface layer of the cover plate 101 which is generally harder—see. FIG. 7. The core cylinder 54 which defines a surface area on which the points of the structures 58, 65 are disposed whose distances from the center line 5 of the anchor are minimal has here a smaller diameter than the bore 105. However, the engagement obtained thereby is sufficient to prevent rotation.

The upper front surface 52 of the engagement section 51 is disposed in the exemplary embodiment of FIG. 7 in the plane of the outer cover plate surface 102. In practice, the front surface 52 is usually disposed one to two tenths of a millimeter below the above-mentioned plane.

The engagement section 51 has a central bore 55 which, at the transition to the for example planar front surface 52, has a 45° face, which is for example 0.5×45°. The bore 55 into which later a mounting means 80 is screwed, see FIG. 7, has for example a diameter of 1.3 mm. The central bore 55, 56 has in general an average diameter which is smaller, by 30%, than the core or minimum diameter of the mounting means 80 to be secured therein.

In the exemplary embodiment, the bore 55 has, among others, the purpose of guiding the mounting means 80, for example a particle board screw, in order to prevent the latter from deviating from the center line 5. The bore 55 is generally shorter than the mounting means 80 to be screwed in, or pounded in; in the shown exemplary embodiment, it is not a through-bore.

Of course, the bore or opening 55 may have any other cross-section. It may be oval, polygonal star-like or have an other cross-section. The opening 55 may also be in the form of a short straight cone 56, see FIG. 9. In this case, the mounting means needs to generate the largest part of the supporting bore by itself.

It is also possible to omit the bore or opening 55, 56 or to provide only a dot mark.

For the mounting of furniture hardware 90, the required cement anchors are, after having been passed through a high-frequency alternating field, pressed into the bores 130 of the lightweight construction panel 100 in a single stroke, the respective hardware 90 is placed into position and is attacked in the cement anchor by means of screws 80.

In the high frequency magnetic alternating field—the frequency is for example between 5 and 30 kHz—eddy currents are generated in the various melt bodies which cause heating of the melt bodies. The heated melt bodies 45-49 melt the solid cement which is arranged in the displacement area 36.

Thereafter, first the cement anchor is inserted into the bore 130 in such a way that the cylindrical body 10 is disposed on the inner surface 113 of the lower cover plate 111. The upper front face 14 of the cylindrical body 10 is then disposed for example 0.5 mm below the inner surface 103 of the upper cover plate 101. With the first relative movement of the piston body 50 relative to the cylinder body 10, the engagement projections 35 disengage from the upper transverse groove 77. Upon further insertion of the piston body 50, an overpressure is generated in the cylinder 33 whereby on one hand the liquefied cement 8 flows downwardly via the opening 43 and, on the other hand, is pressed upwardly via the channels 73. This occurs by force since the open cross-section 44 of the discharge opening 43 is substantially smaller than the sum of the cross-sections 37 of the channels 73, see FIG. 14. The discharge opening 43 also has the effect of a hydraulic throttle, see FIGS. 5, 6.

The cement 8, which is displaced upwardly, collects in the distribution area 32 and in the bore 105. The engagement section 51, which is pushed into the bore 105 compresses the cement 8 disposed in the bore 105 below the surface 103. During the following minutes, the cement 8 hardens, see FIG. 7.

Already during the curing of the cement 8, 9, the furniture hardware 90 may be placed onto the cement anchor to be subsequently fixed in place for example by particle board screws 80 screwed into the respective openings or bores 55 or 56. The particle board screws 80 may further expand the cement anchor so that the engagement section 51 is even more forcefully engaged in the bore 105. In this way, the anchor may even be expanded below the upper cover plate beyond the bore 105 so that the anchor is mechanically encased at the inner surface 103 of the cover plate 101.

As shown in FIG. 6, the piston body 50 has for example channels 73, which are shorter than those shown in FIG. 5. The upper end 75 of the channels 73 is in this case so selected that the channel ends 75 extend just beyond the upper control edge 29 of the cylindrical area 33 when at least a part of the webs 66 of the engagement section 51 is already sealingly disposed in the bore 105. The upper control edge 29 acts like a control edge of a hydraulic valve. The gap between it and the cylindrical wall of the piston section 71 prevents a backflow of the cement 8 when it is still liquid. The cement amount enclosed between the engagement section 51 and the bore 105 can be distributed only in the upper anchor area. The amount of cement to be distributed in the upper part can therefore be controlled by the length of the channels 73.

FIG. 8 shows a cement anchor which consists of only three parts mounted in a lightweight construction panel 100. In this case, the cylindrical body 10 is at the same time a melt body 46 which consists of an aluminum alloy. The pot-shaped cylindrical body 10 whose outer surface may be coated by a 150° C. temperature-resistant lacquer is provided at its upper end area 21 with outwardly extending engagement elements 23 which are separated by narrow longitudinal slots 24. They are arranged in pairs opposite one another so as to extend in planes which intersect along the centerline 5. The outer surfaces of the engagement elements 23 are for example surface sections of a truncated cone envelope whose cone angle is about 30°. The engagement elements 23 have at their upper edges an outer diameter which is greater, by one to three millimeters, than the inner diameter of the bore 105.

In the embodiment shown, the engagement elements 23 are not in contact with the upper cover plate 101 when the anchor is installed. The cement 8 displaced during installation of the anchor is guided by the spread-out engagement elements upwardly toward the cover plate 101 and is distributed there. A part of the cement 8 flows via the longitudinal slots 24 to the area of the support core. Another part flows around the engagement elements 23 at the upper edges thereof below the cover plate 101.

In the shown embodiment, the lower front end of the piston body 50 is not in contact with the bottom of the cylindrical body 10. As a result, the cement 8 cannot be completely displaced from the displacement area 36 upon normal introduction of the piston body 50. The remaining cement is then not available next to the cover plates 101, 111 but the cement anchor is usable in connection with lightweight panels of different thicknesses.

Figure 9:
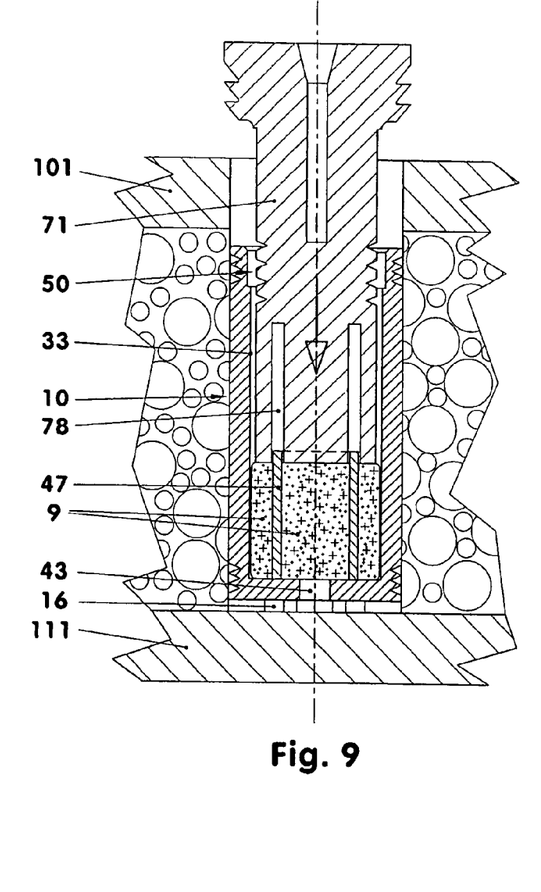
FIG. 9 is a cross-sectional view of an anchor with a melt-down sleeve disposed in the cement material and inserted into a lightweight construction panel.
Figure 10:
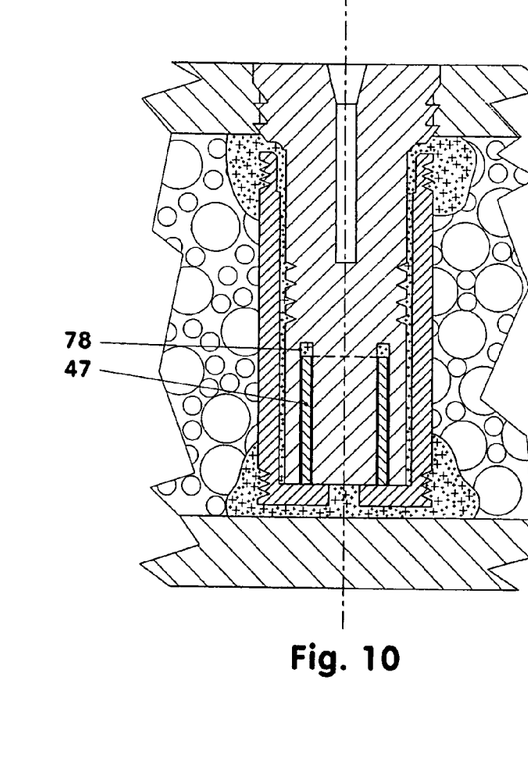
FIG. 10 shows an arrangement like FIG. 9 with the piston unit inserted.

FIGS. 9 and 10 show a cement anchor whose melt body 47 is a so-called internal sleeve. This internal sleeve, or at least part of this internal sleeve 47, is disposed in the cylindrical cement body 9. In this case, the internal sleeve 47 is, on one hand, mostly filled with cement 9 and, on the other hand, radially surrounded by a ring of cement material 9. The internal sleeve 47 projects by for example 0.3 to 2 mm from the upper end of the cement body. The lower end of the cement body 9 ends flash with the lower front end of the internal sleeve 47. During melting of the cement 9, the internal sleeve 47 transmits the heat generated therein efficiently to the cement because of its arrangement within the cement body 9. The cylindrical body 10 is heated only slightly.

In this embodiment, the piston body 50 has in the piston section 71 an at least approximately hexagonal cross-section—see FIGS. 1, 2 and 14. In this case, discharge passages are formed by the planar wall sections of the outer wall of the piston section 71 and cylindrical wall of the cylinder area 33.

The piston section 71 is provided with an annular channel 78, which extends concentrically into the piston body from its lower end. It accommodates the inner sleeve 47 upon installation of the anchor—see FIG. 10.

By the inner sleeve 47, the cement 8, 9 is divided into two parts. The partial amount disposed in the inner sleeve 47 is distributed during insertion of the piston body 50 into the cylinder body 10 to the area ahead of the lower cover plate 111 by way of the bore 43. The partial amount disposed around the internal sleeve 47 is directed during insertion of the piston body upwardly toward the upper cover plate 101. By a selection of the average diameter of the internal sleeve 47, the distribution of the cement material volume within the bore 130 can be determined. In the exemplary embodiment, the partial amount which is pressed through the bore 43 is about 33% of the whole cement material. An additional 33% is pressed—with full piston stroke utilization—via the passages 37 upwardly toward the upper cover plate 101. The remaining 34% interconnect the cylinder body 10 and the piston body 50.

In accordance with the FIGS. 10 and 14, the sum of the cross-sections of the passages 37 corresponds to the discharge cross-section 44 of the opening 43. This permits a rapid insertion of the piston body 50.

Figure 11:
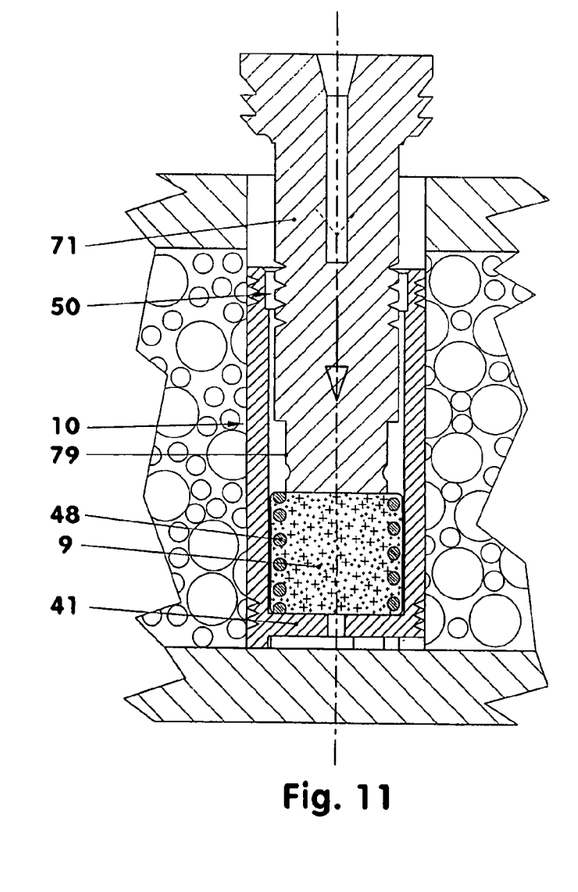
FIG. 11 is a sectional view of an anchor with a melt spring but shown inserted into a lightweight construction panel.
Figure 12:
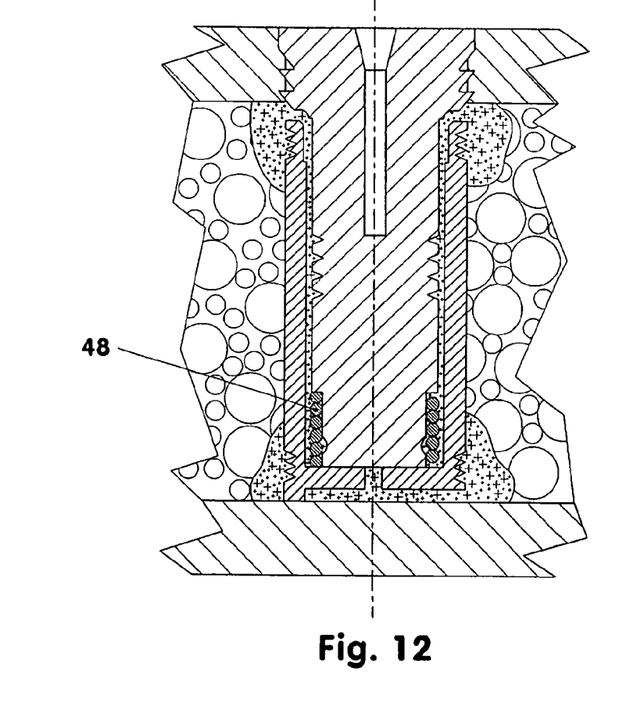
FIG. 12 is the same as FIG. 11 with the piston body inserted however.

FIGS. 11 and 12 also show a cement body 9 with an integrated melt body 48. The latter is a compression coil spring which is almost completely surrounded by cement material 9. It is disposed in the cement body 9 near the outer circumference thereof. After melting of the cement material 9 when the piston body 50 is inserted into the cylinder body 10, the compression coil spring 48 is completely or almost completely compressed. To this end, the piston section 71 includes a displacement section 79, whose outer diameter is smaller than the inner diameter of the compression coil spring 48. The length of the displacement section 79 corresponds to the block length of the compression coil spring 48.

The melt body may also be a tension spring which during the melting process contracts automatically to the block length.

Figure 15:
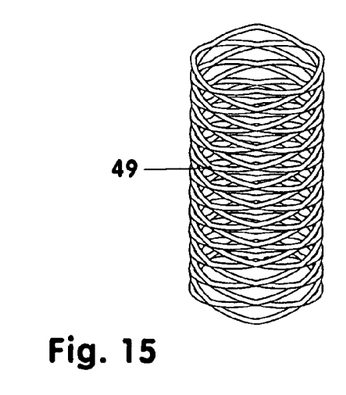
FIG. 15 shows a metal sleeve.

In place of the melt body 48, also a collapsible wire web hose 49 may be used—see FIG. 15.

It is of course, also possible to integrate into the cement material a larger number of metal balls or comparable bodies such as platelets, washers or rings which then, upon melting of the cement, sink to the bottom 41.

Figure 16:
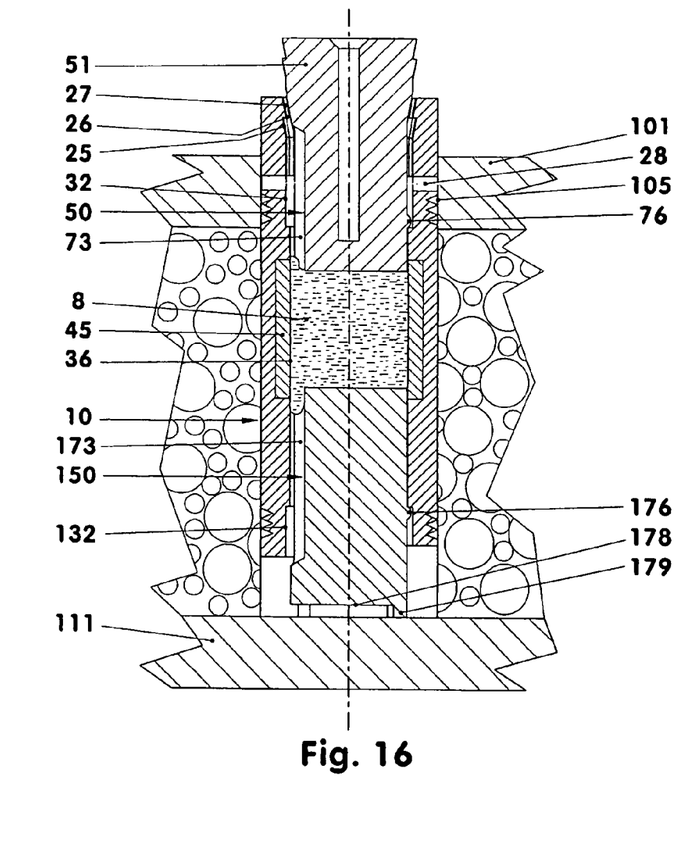
FIG. 16 is a cross-sectional view of an anchor with two piston bodies.
Figure 17:
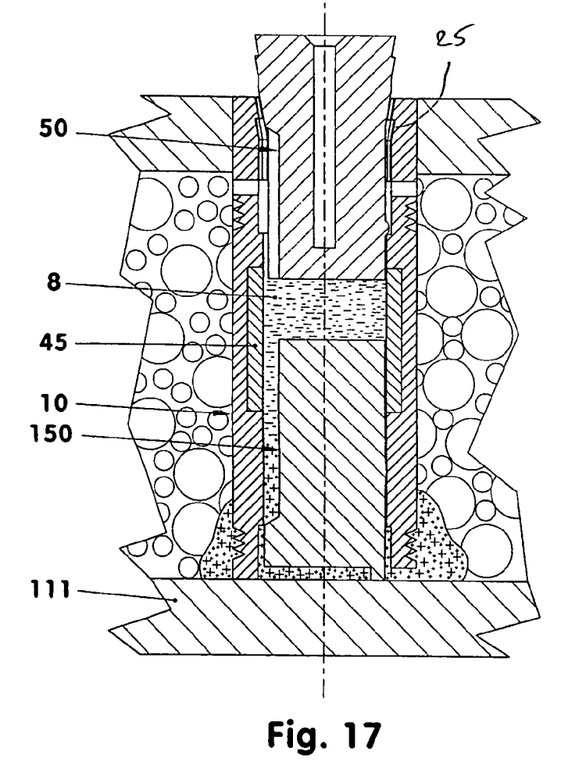
FIG. 17 is a view like FIG. 16 but with the lower piston body inserted.
Figure 18:
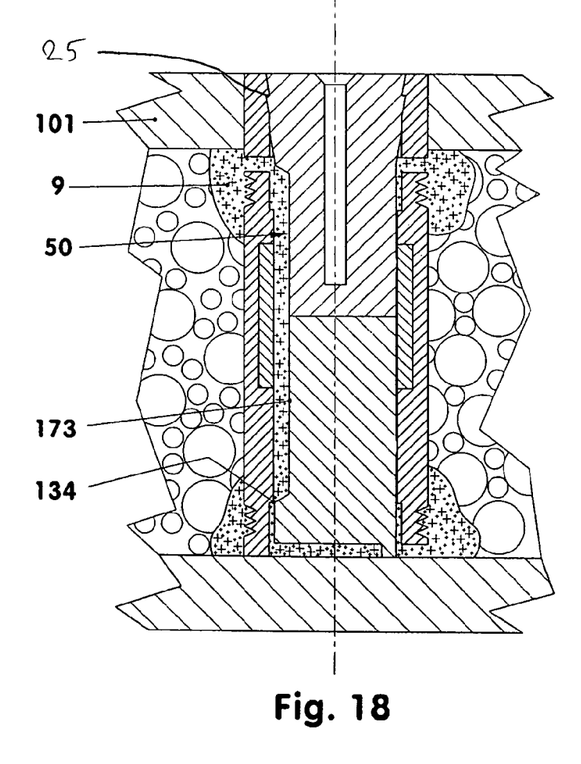
FIG. 18 is a view like FIG. 17 with the upper piston body additionally inserted.

FIGS. 16-18 show a cement anchor with two piston bodies 50, 150, which are movable relative to each other. The cylindrical bodies 10 of the cement anchor has a design which differs from the variants described above. It has a length which corresponds to the sum of the intermediate layer thicknesses and the wall thickness of the upper cover plate 101. This length may also be slightly less than the sum.

The inner wall of the upper cylinder body area is provided with at least one engagement recess 25 whose upper flank 26 forms for example an inclined side wall. In addition, the inner wall is provided in the area in which the engagement section 51 is disposed when the anchor is installed—see FIG. 6—with a plurality of longitudinal serrations 27. In order to fix the engagement section 51 after installation in the cylinder body 10 so as to prevent its rotation, the outer wall of the engagement section 51 has a corresponding structure which securely engages into the serrations 27 to prevent relative movement.

Above the circumferential grooves 17, the cylindrical body 10 is provided with circumferentially distributed transverse bores 28 or recesses with non-circular cross-section via which the still liquid cement 8 is distributed to the area below the upper cover plate 101 during the insertion of the piston body 50 into the cylinder body 10.

In the cylinder body 10, the displacement area 36 and the melt body 45 are arranged centrally and the bottom 41 is omitted. In addition, the lower center area includes a second distribution area 132. The outer wall of the cylinder body 10 has for example no structured area in the upper part.

The upper piston body 50 is mostly a shortened version of the piston body shown in FIG. 5. The lower reversely-installed piston body 150 does not have an engagement section: It may be longitudinally guided in the cylinder body 10 by a corresponding profile structure so that it is not rotatable. Both piston bodies 50, 150 abut the cylindrical body 10 in the distribution areas 32, 132.

For installation, the cement anchor is inserted, with the cement material 9 heated, into the bore 130. The lower piston body 150 is now disposed on the lower cover plate 111. In order to permit the cement 8 to flow between the lower piston body 150 and the cover plate 114, the lower front face of the piston body 150 is provided with for example three feet 179.

In order to distribute the still liquid cement 8, the cylinder body 10 and the upper piston body 50 are moved together downwardly toward the lower cover plate 111. The cylinder body 10 then slides over the lower piston body 150. With an increase in pressure the cement 8 flows toward the cover plate 111, see FIG. 17. As soon as the cylinder body 10 abuts the lower cover plate 111, a lower control edge 134 closes the lower channels 173.

Then the piston body 50 is pushed downwardly. In accordance with the principle of displacement, the cement 8 flows in the area of the upper cover plate 101—see FIG. 18. The upper piston body 50 engages with the cylinder body 10. After some time, the cement is cured.

With all cement anchors shown herein, it is possible to extend the cylindrical body 10 so that it extends into a dead end bore drilled into the lower cover plate 111, see DE 10 2006 049 954 A1.

As available from a supplier, the cement anchor is not actuated, that is, the displacement area 36 is filled with solid, possibly granular or powder-like cement material 8 and the piston body 50 projects from the cylinder body 10 by the length of its insertion stroke.

If the cement 9 filled into the cylinder body 10 is a solid cylinder or block, this solid body may be cemented between the cylinder body 10 and the piston body 50.

FIGS. 5, 9, and 11 show cement anchors which are disposed in the bores 130. Herein, the cement materials 9 are shown as rigid bodies 9, which are placed during assembly into the cylinder bodies 10. In the above-mentioned figures, the cement materials 9 are already molten since they were subjected to the high frequency magnetic alternating field outside the lightweight construction plate 100. It is also conceivable however to insert the anchors first into the bores 130 and then heat the melt bodies 45-49 via a high frequency alternating magnetic field from without.

| Listing of Reference Numerals | |
|---|---|
| 5 | Center line of anchor |
| 6 | Anchor installation arrangement |
| 8 | Liquid cement |
| 9 | Cement material |
| 10 | Cylinder body |
| 11 | Tubular section |
| 14 | Upper front end |
| 16 | Legs |
| 17 | Top circumferential grooves |
| 18 | Bottom circumferential grooves |
| 21 | Upper end area |
| 22 | Lower end area |
| 23 | Engagement element |
| 24 | Longitudinal slot |
| 25 | Engagement recess |
| 26 | Flank |
| 27 | Longitudinal serrations |
| 28 | Transverse bores |
| 29 | Upper control edge |
| 31 | Cavity |
| 32 | Distribution area |
| 33 | Cylindrical area |
| 35 | Support projection |
| 36 | Displacement area |
| 37 | Cross-section |
| 41 | Bottom |
| 42 | legs |
| 43 | Discharge opening |
| 44 | Cross-section |
| 45 | Cylindrical melt body |
| 46 | Melt body |
| 47 | Cylindrical melt body |
| 48 | Cylindrical melt body |
| 49 | wire web hose |
| 50 | Piston body |
| 51 | Engagement section |
| 52 | Front surface |
| 53 | Enveloping surface |
| 54 | Core cylinder |
| 55 | Central bore |
| 56 | Conical bore |
| 58 | Structured zone, serration |
| 59 | Teeth |
| 65 | Structured zone, serration |
| 66 | Web |
| 67 | Slide flanks |
| 68 | Locking flanks |
| 71 | Piston section |
| 72 | Bottom surface |
| 73 | Channels |
| 74 | Lower channel end |
| 75 | Upper channel end |
| 76 | Support knubs, projections |
| 77 | Transverse grooves |
| 78 | Annular channel |
| 79 | Displacement section |
| 80 | Mounting means, screws |
| 81 | Screw head |
| 82 | Shaft |
| 90 | Hardware |
| 91 | Bore |
| 100 | Lightweight construction panel |
| 101 | Cover plate |
| 102 | Outer coverplate surface |

-continued

Listing of Reference Numerals

| | |
|---|---|
| 103 | Inner surface |
| 105 | Bore section |
| 111 | Cover plate |
| 113 | Inner surface |
| 121 | Support core |
| 125 | Bore section |
| 130 | Bore |
| 132 | Distribution area |
| 134 | Control edge |
| 150 | Piston body |
| 173 | Lower channels |
| 176 | Support projection |
| 178 | Front face |
| 179 | feet |

What is claimed is:

1. A cement anchor for use in connection with lightweight construction panels (100), said cement anchor comprising: at least a cylindrical body (10) with at least one piston body (50, 150) forming together a displacement area (36) with at least one discharge opening (37, 44), the displacement area (36) including a thermally meltable cement material, and at least one electrically heatable melt body (45, 49) disposed in the displacement area (36) in contact with the cement material (9) for melting the meltable cement material (9) upon heating of the melt body (45-49).

2. The cement anchor according to claim 1, wherein the meltable cement material (9) is in the form of a single cylindrical body.

3. The cement anchor according to claim 1, wherein the melt body (45, 47) is a cylindrical metallic sleeve.

4. The cement anchor according to claim 1, wherein the cylindrical body (10) forms the melt body (45).

5. The cement anchor according to claim 1, wherein the at least one piston body (50, 150) includes at least one channel (73, 173), which, as seen in the direction of movement of the piston, begins at a piston bottom face (72) and, with the cement anchor compressed, ends at the respective rear end area (21, 22) of the cylindrical body (10).

6. The cement anchor according to claim 1, wherein the piston body (50) includes means for accommodating a mounting structure (80).

7. The cement anchor according to claim 1, wherein the piston body (50, 150) has a central opening (55, 56) for accommodating a mounting means (80).

8. A method of installing and fixing a cement anchor in a lightweight construction panel (100), wherein the cement anchor comprises at least one piston body (50, 150) and a cylinder body (10) in which the piston body (50, 150) is disposed together with an electrically or inductively heatable melt body (45-49), the lightweight construction panel including a bore for accommodating the cement anchor, said method comprising the steps of: energizing the melt body (45-49) to heat the melt body to cause melting of the cement in the space within the cylindrical body and inserting the cement anchor (10) into the bore (130) in the lightweight construction panel (100), and compressing the cylindrical body (10) and the piston body (50, 150) to displace the melted cement from the space within the cylindrical body (10) into the space around the anchor whereupon the cement hardens and firmly joins the anchor with the lightweight construction panel.

* * * * *